UNITED STATES PATENT OFFICE.

MORITZ SCHREIBER, OF FÜRSTENBERG, NEAR FRANKFORT-ON-THE-ODER, PRUSSIA, GERMANY.

METHOD OF TEMPERING LAMP-CHIMNEYS.

SPECIFICATION forming part of Letters Patent No. 363,087, dated May 17, 1887.

Application filed July 9, 1886. Serial No. 207,580. (No model.)

*To all whom it may concern:*

Be it known that I, MORITZ SCHREIBER, of the city of Fürstenberg, near Frankfort-on-the-Oder, Kingdom of Prussia, Empire of Germany, have invented certain new and useful Improvements in the Methods of Tempering Lamp-Chimneys and other Hollow Glass Articles, of which the following is a specification.

In the manufacture of lamp-chimneys and other hollow glass articles it is very difficult to produce them in such a manner that there are no undue strains in said glass bodies, which strains cause the glass bodies to crack and break whenever they are subjected to sudden change of temperature. The said undue strains are caused during the manufacture by irregularities in tempering the articles or by the varying thickness of the said articles during the manufacture—that is, during the process of blowing or shaping the articles are cooled irregularly. They also cool irregularly before they are placed in the tempering-furnace, and even in said tempering-furnace all parts do not cool uniformly.

Heretofore lamp-chimneys were heated at the upper end for the purpose of smoothing the ground-end surface, and also to permit impressing the trade-mark. By this manipulation undue strains were also produced.

The object of my invention is to produce lamp-chimneys and other hollow glass articles in such a manner that said injurious strains are totally avoided. This I accomplish in the following manner: The said articles—such as lamp-chimneys or other hollow glass articles—are provided with a mark after they have been ground, which mark is produced by means of colored finely-powdered glass or enamel, or any other paint the fusing-point of which is about the same as that of the glass. The lamp-chimneys or other articles are placed on iron rods, bars, or mandrels of proper shape, and the said rods, with the glass objects on them, are placed into a suitable oven or muffle, in which they are heated and constantly turned until the above-mentioned mark melts and fuses into the glass—that is, until the glass is almost heated to the fusing-point. In the former methods of manipulating only a portion of the cylinders were heated to this degree. By heating the chimneys or other glass objects in the manner described all the above-mentioned injurious strains are removed. After the objects have been heated they are placed near the oven and permitted to cool rapidly in the open air. If desired, they can be cooled in a special chamber provided with or connected with suitable mechanism for creating a draft. A greater number of the said hollow glass articles can be heated at the same time in a suitable muffle, and when they are heated to the desired degree the muffle is removed and both ends are opened, whereby the rapid cooling takes place.

By applying my improved method the trademark is also burned into the chimney at the same time the injurious strains are removed, and the ground-end surface of certain articles—such as chimneys—is smoothed in the same operation.

I am aware that it is not new to temper glass while hot in suitable material and protecting it from the air. I am also aware that it is not new to harden and toughen glass by granular, pulverulent or other finely-powdered substances projected in a cool state upon the glass. I am also aware that it is not new to harden and toughen glass by submerging the heated glass in oil. All this I do not claim.

I am also aware that it is common to allow lamp-chimneys to cool in the open air after having been made, without reheating.

Having thus described my invention, I claim as new and desire to secure by Letters Patent—

The method, substantially as herein shown and described, of tempering lamp-chimneys for the purpose of preventing or removing the injurious strains in the same, consisting in heating them almost to the fusing-point, and then cooling them very rapidly in the open air, or in a current of air, substantially as shown and described.

In testimony that I claim the foregoing as my invention I have signed my name in presence of two subscribing witnesses.

MORITZ SCHREIBER.

Witnesses:
 B. ROI,
 H. SCHLOSS.